V. A. RUSSO.
RULER ATTACHMENT.
APPLICATION FILED AUG. 8, 1913.
1,091,461. Patented Mar. 24, 1914.
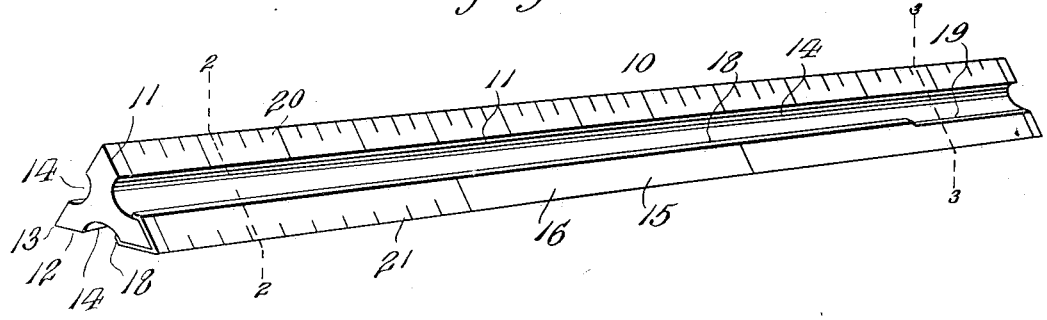
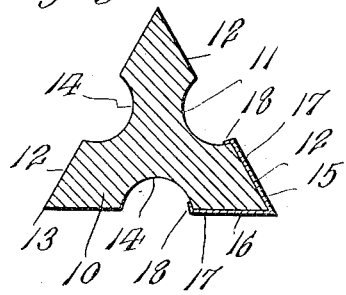 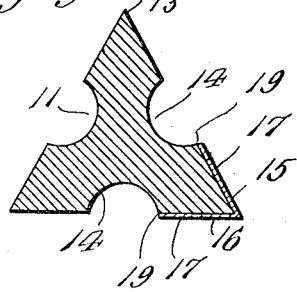
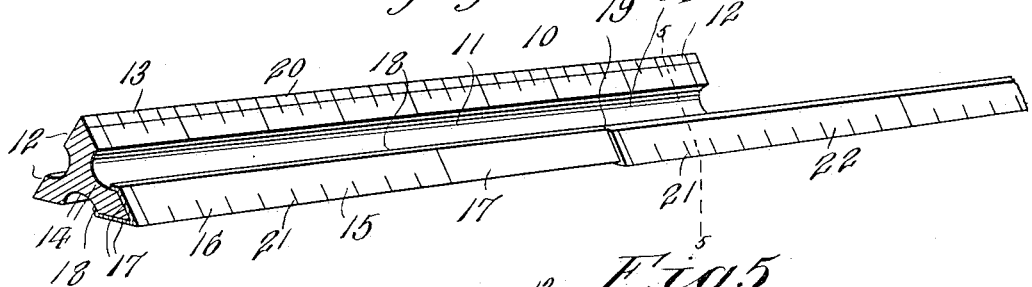
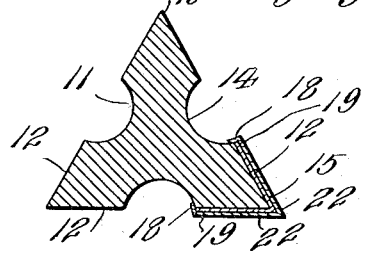
Witnesses
Frank Hough
F. H. Hosler
Inventor
Virgil A. Russo
By Victor J. Evans
Attorney

UNITED STATES PATENT OFFICE.

VIRGIL A. RUSSO, OF ALLENTOWN, PENNSYLVANIA.

RULER ATTACHMENT.

1,091,461. Specification of Letters Patent. Patented Mar. 24, 1914.

Application filed August 8, 1913. Serial No. 783,805.

*To all whom it may concern:*

Be it known that I, VIRGIL A. RUSSO, a subject of the King of Italy, residing at Allentown, in the county of Lehigh and State of Pennsylvania, have invented new and useful Improvements in Ruler Attachments, of which the following is a specification.

An object of the invention is to provide an attachment for rulers whereby the units of measure on the attachment can be related to and compared with the units of measure on the ruler, and whereby the length of the ruler with respect to the drawing of lines can be increased relatively to the length of the body of the ruler.

The invention embodies, among other features, the provision of a simple device preferably adapted for sliding engagement with the ruler and which is adapted to have graduations in the metric system or some other unit of measure thereon so that the units of measure on the attachment can be compared with and related to the units of measure on the body of the ruler.

The invention still further comprehends an attachment for use in connection with a ruler and which, by means of a second similar attachment in the nature of an extension, can be connected to the first attachment so that the ruler can be employed for drawing lines or measuring lines or figures of greater length or size than the length of the ruler.

In the further disclosure of the invention reference is to be had to the accompanying drawings, constituting a part of this specification, in which similar characters of reference denote corresponding parts in all the views, and in which:

Figure 1 is a perspective view of a ruler showing my attachment thereon; Fig. 2 is a vertical transverse sectional view taken on the line 2—2 adjacent one end of the ruler as shown in Fig. 1; Fig. 3 is a vertical transverse sectional view taken on the line 3—3 adjacent the other end of the ruler; Fig. 4 is a fragmentary perspective view of the ruler having my device thereon, and showing an extension connected thereto; and Fig. 5 is a vertical transverse sectional view taken through the end of the attachment carrying the extension.

Referring more particularly to the views, I disclose a ruler 10, preferably of the well known triangular form and including a ruler body 11 having relatively inclined longitudinal faces 12 terminating in the usual straight edges 13, with recesses 14 formed on the ruler body as shown, this being the usual construction of the well known triangular ruler or scale.

A member 15, preferably made of a light sheet metal or celluloid, is adapted for use in connection with the triangular ruler 10 and consists of a single piece of strip-like material 16 bent longitudinally at its medial portion to provide diverging sides 17 terminating in inwardly bent gripping members 18 extending longitudinally of the sides 17 as shown, the said gripping members 18 at one end of the member 15, however, being cut away to form a seat 19 for a purpose that will be hereinafter more fully disclosed. The faces 12 of the ruler 10 preferably have a series of graduations 20 thereon, indicating the usual linear measure, and the member 15 is also provided with graduations 21 preferably indicating the metric system or some other linear measure in some way related to or comparable with the linear measure indicated by the graduations 20 of the ruler 10.

Now referring to Fig. 1 it will be apparent that the member 15 can be readily arranged in sliding engagement with one of the faces 12 as shown, with the sides 17 of the member covering the tapering sides of the face 12 to which the member is applied and the gripping members 18 of the member extending into the recesses 14, thus holding the member against transverse movement on the ruler without, however, preventing the member from being slid into or out of engagement with the ruler. Now it will be apparent that when the member is applied to the ruler as mentioned, the graduations 21 of the member can be related or compared with the graduations 20 on the ruler and thus a convenient mode of readily converting the length of a line or size of a figure from inches to the unit of measurement known as the metric system, is provided.

As mentioned heretofore, one end of the member 15 constitutes a seat 19 and an extension 22, similar in every respect to the member 15, is provided and adapted for sliding engagement with the member at that end of the member having the seat 19 thereon so that one end of the extension 22 can be slid on to and over the seat 19, thus materially increasing the length of the ruler so that measurements greater than the capacity of the ruler body 11 can be easily computed.

It will be readily understood that my attachment provides a device which will constitute an efficient advertising medium, particularly in view of the fact that the attachment can be cheaply manufactured and will be preferably stamped from aluminum or some other cheap and light material.

Having thus described my invention, I claim:

As a new article of manufacture, a ruler attachment for use on a ruler body, said body having longitudinal faces inclined to each other and having a longitudinal recess in each face, said attachment comprising a member bent along its medial longitudinal portion to provide inclined sides terminating in inwardly bent gripping members, the said attachment being adapted for sliding engagement with the body of the ruler to cover the flat faces thereof and having the gripping members extending into the recesses of the body of the ruler.

In testimony whereof I affix my signature in presence of two witnesses.

VIRGIL A. RUSSO.

Witnesses:
F. A. HOSTER,
BENNETT S. JONES.